(12) United States Patent
Cates, Jr.

(10) Patent No.: US 9,780,576 B1
(45) Date of Patent: Oct. 3, 2017

(54) RESONANT INDUCTIVE COUPLING EXTENSION CORD FOR LIGHT EMITTING DIODES

(71) Applicant: Marion Harlan Cates, Jr., Birmingham, AL (US)

(72) Inventor: Marion Harlan Cates, Jr., Birmingham, AL (US)

( * ) Notice: Subject to any disclaimer, the term of this patent is extended or adjusted under 35 U.S.C. 154(b) by 176 days.

(21) Appl. No.: 14/933,962

(22) Filed: Nov. 5, 2015

(51) Int. Cl.
| | |
|---|---|
| *H05B 37/02* | (2006.01) |
| *H05B 39/04* | (2006.01) |
| *H05B 41/36* | (2006.01) |
| *H02J 5/00* | (2016.01) |
| *H02M 7/48* | (2007.01) |
| *H02M 7/538* | (2007.01) |
| *H05B 33/08* | (2006.01) |

(52) U.S. Cl.
CPC .......... *H02J 5/005* (2013.01); *H02M 7/4826* (2013.01); *H02M 7/53803* (2013.01); *H05B 33/0815* (2013.01)

(58) Field of Classification Search
None
See application file for complete search history.

(56) References Cited

U.S. PATENT DOCUMENTS

| | | | |
|---|---|---|---|
| 645,576 A | 3/1900 | Tesla | |
| 6,317,338 B1 | 11/2001 | Boys | |
| 6,459,218 B2 | 10/2002 | Boys et al. | |
| 7,856,220 B2 | 12/2010 | Cheng et al. | |
| 8,106,539 B2 | 1/2012 | Schatz et al. | |
| 8,363,426 B2 | 1/2013 | Kataargin | |
| 8,427,101 B2* | 4/2013 | Saunamaki | H02J 5/005 320/108 |
| 8,441,154 B2* | 5/2013 | Karalis | H03H 7/40 307/104 |
| 2011/0156494 A1 | 6/2011 | Mashinsky | |
| 2013/0119929 A1* | 5/2013 | Partovi | H02J 7/025 320/108 |
| 2015/0230312 A1* | 8/2015 | Akiya | H02J 5/005 315/70 |
| 2016/0248265 A1* | 8/2016 | Oo | H02J 5/005 |

* cited by examiner

*Primary Examiner* — Anh Tran
(74) *Attorney, Agent, or Firm* — Gerald M. Walsh; Leo Law Firm, LLC

(57) ABSTRACT

A resonant inductive coupling extension cord and light emitting diode system having a plurality of light emitting diodes (LEDS) connected to a receiver coil designed to receive a pulsed DC current from a power supply by means of resonant inductive coupling. The power supply generates a pulsed DC current at a frequency of 0.8 KHz or greater, wherein the pulsed DC current is positive relative to ground. The power supply provides the pulsed DC current through a power coil and through the extension cords to the receiver coil. The (LEDs) are powered through resonant inductive coupling up to 160 volts. The light emitting diodes are self-limiting with respect to current. There is no potential for a spark or shock hazard when the extension cords are connected to the power supply, to the LED system or each other or whether the extension cords or LED are cut or broken.

31 Claims, 4 Drawing Sheets

RESONANT INDUCTIVE COUPLING EXTENSION CORD FOR LIGHT EMITTING DIODES

FIELD OF THE INVENTION

The present invention relates to electric power transmission and, more particularly, to resonant inductive coupling extension cords that provide electric power transmission over long distances without spark-generating connections. This system also provides for improved efficiency for inductive LED systems as no other components other than coiled wire and LEDs are necessary.

BACKGROUND OF THE INVENTION

The prevention of electrically generated sparks in many industrial environments is essential for preventing explosions. Electric powered lights can be hazardous in locations such as service stations, coal mines, chemical plants, and similar areas where light is needed but where electric sparks are a potential hazard. In these places special electrical cords, explosion proof sealed containers, and complex safety plugs are required to prevent ignition of flammable substances. The danger of causing explosion of flammable substance lies mainly in the connections, where disconnection of even special plugs can cause sparks. Sparks can also occur if the electrical cables or wires are cut. An industrial area of most concern is coal mines, which have a continual presence of methane gas. Coal mines require lights in corridors and on mining machinery, in transport areas and in special areas for construction or maintenance.

Resonant inductive coupling is also being used in wireless power systems. Resonant inductive coupling is the near field wireless transmission of electrical energy between two magnetically coupled coils that are part of resonant circuits tuned to resonate at the same frequency. A transmitter coil in one device transmits electric power across an intervening space to a resonant receiver coil in another device. Resonant transfer works by making a coil having an oscillating current. This generates an oscillating magnetic field. If a second coil is brought near it, the coil can pick up most of the energy before it is lost. This arrangement of resonant inductive coupling provides a short range of wireless transmission of electric power from one device to another which does not create sparks. However this form of safe wireless transmission is not useful for distances greater than 2 meters. What is needed is a resonant inductive coupling system that will transmit electric power over hundreds of feet and which can provide sufficient electric power to operate motors and lights and other electric devices.

SUMMARY OF THE INVENTION

This invention is resonant inductive coupling extension cord system, comprising a power supply having a power coil, the power supply generating a pulsed DC current at a frequency of 0.8 KHz or greater in the power coil. The pulsed DC current is positive relative to ground. The power coil is designed to transmit the pulsed DC current to a receiver coil by means of resonant inductive coupling. The system has an extension cord or a plurality of extension cords, each extension cord having a receiver coil on one end to receive pulsed DC current through resonant inductive coupling and a transfer coil on an opposite end to transmit pulsed DC current through resonant inductive coupling. The power supply provides the pulsed DC current, by means of resonant inductive coupling, through the power coil to any receiver coil on an electrically operated device, to any receiver coil on the extension cord or on the plurality of said extension cords, and to any transfer coil on the extension cord or on the plurality of extension cords. The receiver coil of each extension cord in the plurality of extension cords is connectable, by resonant inductive coupling, to a transfer coil of another extension cord in the plurality of extension cords, in series or in parallel or in series and in parallel.

The power supply has two n-channel metal oxide semiconductor field-effect transistors (MOSFETs) in phase opposition to generate the pulsed DC current. The MOSFETs are designed to deliver an output of two DC pulses, caused by alternatively grounding two sides of said power coil, said power coil receiving current through a center tap.

The resonant inductive coupling extension cord system also has plurality of light emitting diodes connected to a receiver coil designed to receive the pulsed DC current from the power supply by means of resonant inductive coupling. The receiver coil of the plurality of light emitting diodes is connectable by resonant inductive coupling to the power coil or to a transfer coil. The plurality of light emitting diodes is arranged in a first section and in a second section, wherein the first section has one or more light emitting diodes which are arranged in one direction and the second section has one or more light emitting diodes which are arranged in a second opposite direction. The light emitting diodes in this configuration are self-limiting with respect to current and can be powered by the power supply by resonant inductive coupling up to 160 volts. Each section may have a plurality of rows of LEDs, with each row having a plurality of LEDs connected in series and having LEDs in a row being connected in parallel to adjacent LEDs in an adjacent row.

An advantage of the present invention of a resonant inductive coupling extension cord for light emitting diodes is an extension cord and light system that has no potential for a spark or shock hazard.

Another advantage is the ability to change lights and extension cords without the need to shut of the power.

Another advantage that cuts or breaks in the extension cords or lights produce no hazard.

Another advantage is that the extension cords an lights can be used safely near or under water.

Another advantage is that the power coils, receiver coils, and transfer coils can be completely seal to avoid corrosion.

Another advantage that self-limiting current in the light emitting diodes does not require resistors and does not have a corresponding associated power loss.

Another advantage is a light emitting diode system that has increased lumens per watt compared to existing light emitting diode systems.

Another advantage is a system for resonant inductive coupling extension cords with light emitting diodes that is relatively simple and inexpensive to manufacture and maintain as only LEDs and the inductive coils are necessary for effective transmission of power. This power can be used directly without rectification, capacitors or other electronic components for the coil, conductive wire and light panel. This system has also shown a remarkable tolerance for voltages, two to ten times the LED rating as the system self regulates the current through the LEDs over a wide range of voltages, while maintaining sufficient current to fully light the LEDs. The inductive coupling described is capable of extension of the distance to 100 feet or more the power can be transmitted and still provide sufficient power the LED panel.

DETAILED DESCRIPTION OF THE INVENTION

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

The resonant inductive coupling extension cord system of the present invention comprises a high frequency power supply which has a power coil and an extension cord with a receiver coil on one end and a transfer coil on an opposite end. A receiver coil is connected to the power coil and power is transmitted to the receiver coil by resonant magnetic induction and also to the opposite transfer coil. An electric device, such as a motor or light, having a receiver coil, can be powered by resonant magnetic induction by connecting the receiver coil of the device near the power coil or near the transfer coil on a resonant inductive coupling extension cord which is powered by the power coil. The resonant inductive coupling extension cord can be of any desired length or there can be a plurality of resonant inductive coupling extension cords connected in series and/or in parallel to power one or more devices.

Figure 1:
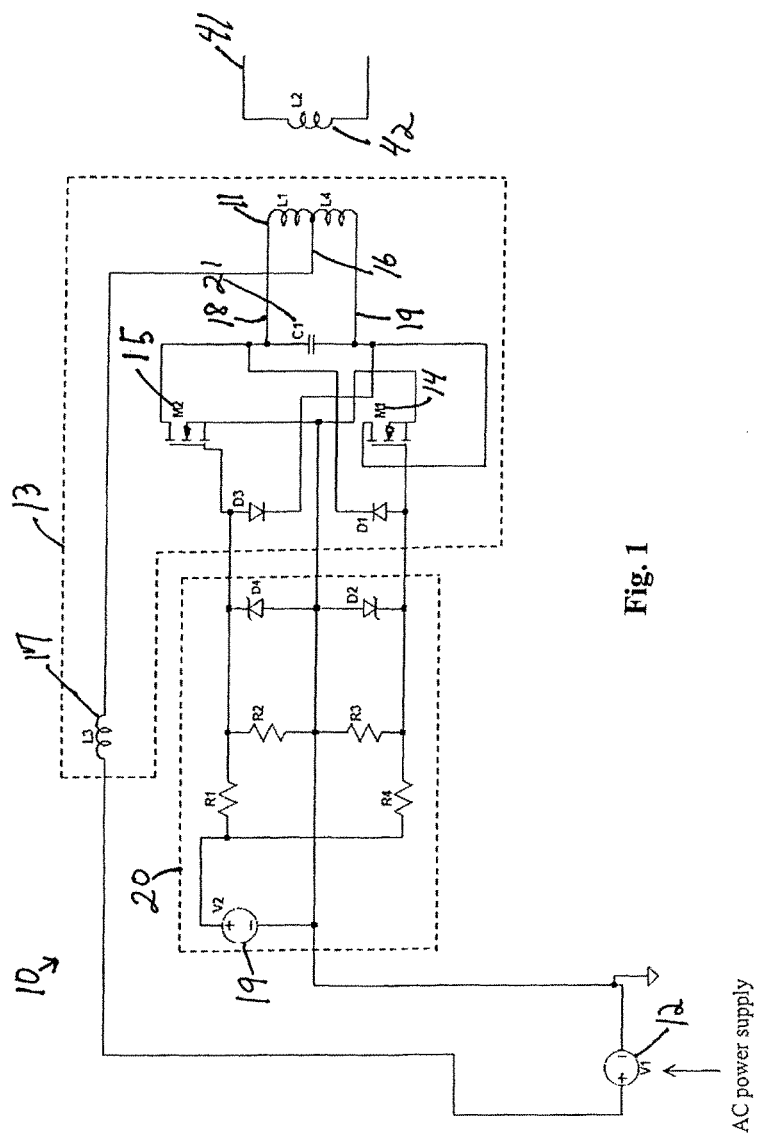
FIG. 1 is a diagram of power supply for a concentric power coil having a DC powered circuit using 24 VDC to power a modified push-pull type circuit.

The power supply 10 for a concentric power coil 11 is a DC powered circuit 12 using 24 VDC to power a modified push-pull type circuit as illustrated in FIG. 1. The push-pull circuit is a balanced oscillator 13 employing two n-channel (twin) metal-oxide semiconductor field-effect transistors (MOSFETs) 14, 15 in phase opposition to deliver a continuous output of two DC pulses of current, caused by alternately grounding two sides of the concentric power coil 11, with a center tap 16 providing the voltage/current to the concentric power coil 11. The incoming voltage/current is passed through an inductor 17, which temporarily stores energy until the energy is released by alternately grounding the positive 18 and negative 19 leads of the concentric power coil 11 through the twin MOSFETs 14, 15. The DC pulses to the MOSFETs 14, 15 are generated from a 12-VDC 19 regulated circuit 20 which alternately stops electric current through the MOSFETs 14, 15. An increase in voltage to the MOSFETs 14, 15 up to a point will cause the MOSFETs 14, 15 to be triggered, which stops the flow of current through the MOSFET 14, 15 and the power coil 11. At the same time, the capacitor C1 21 will discharge. The power coil 11 center tap 16 at the middle of the length of the power coil 11 allows an oscillation in the electric current in the circuit of power supply 10. The power coil 11 may be constructed by methods well known in the art and is insulated.

Figure 2:
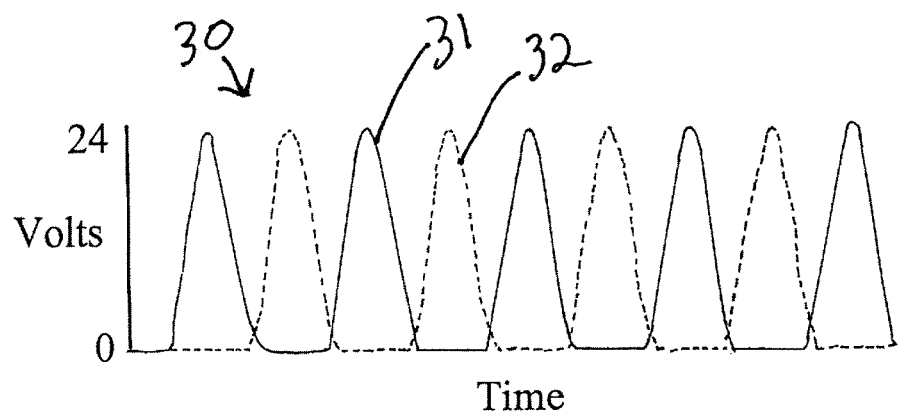
FIG. 2 illustrates the voltage wave form of the DC pulses of electric current generated by the power supply

An illustration of the voltage wave form 30 of the two DC pulses of electric current is shown in FIG. 2. The solid line 31 represents a first set of pulses of electric current and the dashed line 32 represents as second set of pulses of electric current. The voltage is positive relative to ground (unreferenced alternating current). Because the voltage is positive relative to ground no sparks or shocks are created when a power coil 11 and a receiver coil 42 are connected or disconnected or when a transfer coil 43 and a receiver coil 42 of extension cords 41 are connected or disconnected (see FIG. 3). Also, no sparks or shocks are created when an extension cord 41 is cut. An earth ground can touch any part of the system without producing any sparks, shocks, or alteration in power output.

Figure 3:
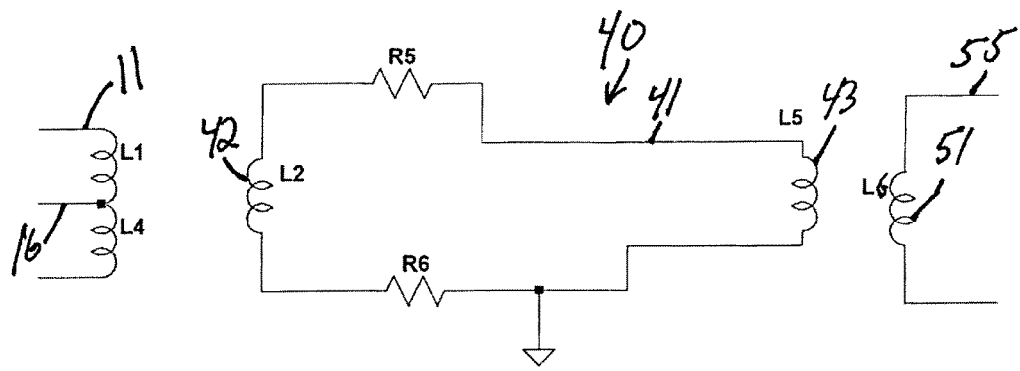
FIG. 3 is a diagram of the resonant inductive coupling extension cord of the present invention.

FIG. 3 shows a diagram of the extension cord circuit 40. The extension cord 41 has a receiver coil 42 on one end and a transfer coil 43 on an opposite end. A receiver coil 42 can serve as a transfer coil 43 and a transfer coil 43 can serve as a receiver coil 42. The receiver/transfer coils 42/43 are constructed by methods well known in the art and are insulated. The extension cord 41 is constructed of any suitable wire used for extension cords. Because of insulation around the coils, when a receiver coil 42 is connected to a power coil 11 or transfer coil 43 direct contact between the electrically conducting material of the coils is not made. Power is transferred only by resonant magnetic induction. The extension cord can be up to 100 feet long.

Figure 4:
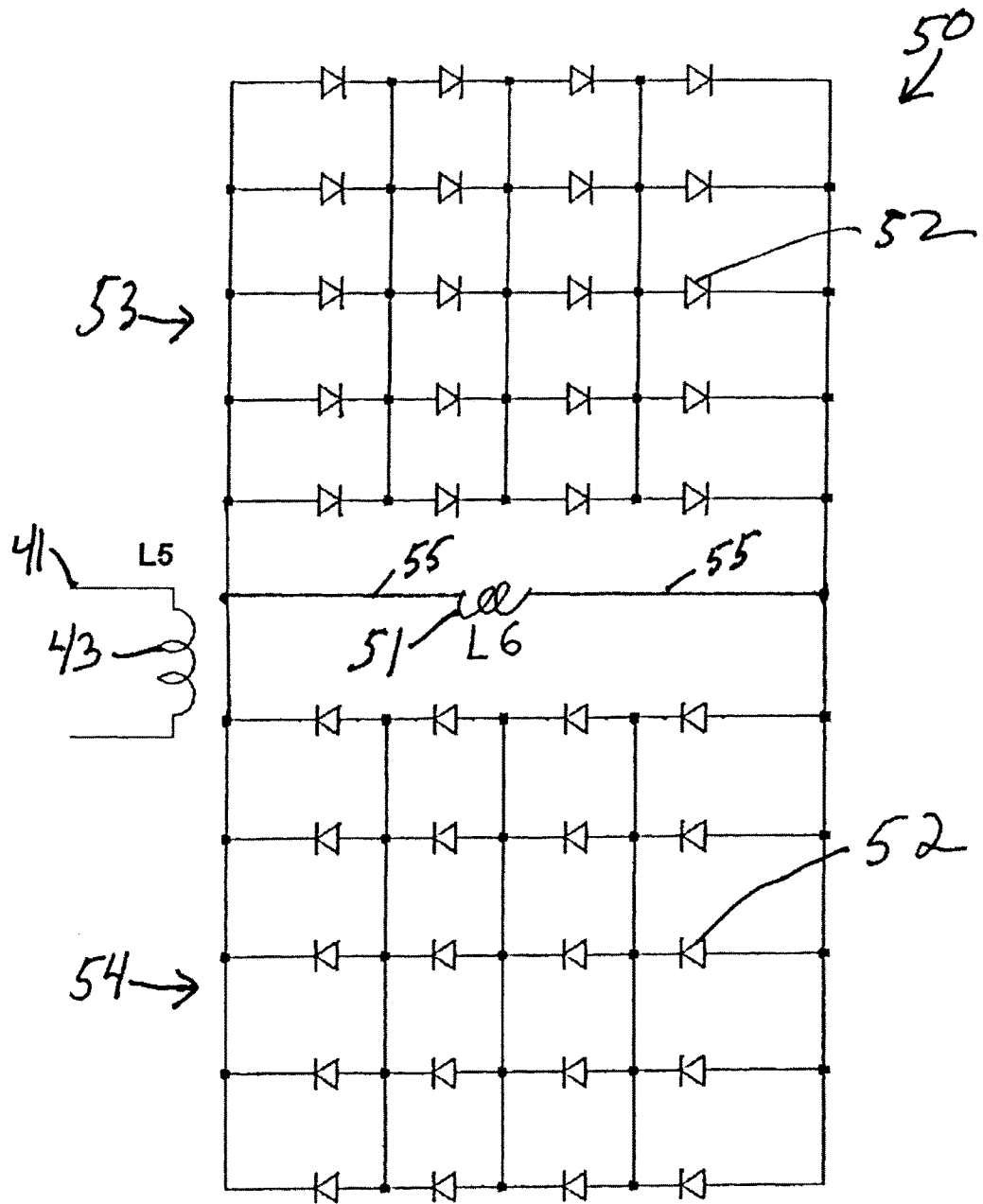
FIG. 4 is a diagram of the light emitting diode (LED) light panel assembly of the present invention.

FIG. 4 shows a light emitting diode (LED) panel assembly 50 of this invention. The light panel assembly 50 consists of a receiver coil 51 and an arrangement of LEDs 52. The LEDs 52 in the light panel assembly 50 are arranged, for example, in two sections 53, 54. Each section 53, 54 may have one or more LEDs 52. Each section 53, 54 has, for example, five rows of LEDs 52 with each row having four LEDs 52. The LEDs in each row are connected in series. Every LED in a row is connected in parallel to an adjacent LED in an adjacent row. This configuration makes a matrix of LEDs with each input and output of a given LED being connected to adjacent LEDs.

LEDs 52 in the first section 53 all are oriented in one direction and in the second section 54 are oriented in an opposite direction, with regard to the incoming wiring 55 of the receiver coil 51. The LEDs may be 0.5 watt 5730 SMD made by Shenzhen Smalite Opto-Electric Co., LTD. If true ground is connected to either side of the light panel assembly 50 there will be no effect on the performance of the LEDs. There is no spark or electric shock potential with the LEDs in this configuration.

When the receiver coil 51 of the light panel assembly 50 is connected to the power coil 11 or transfer coil 43 of an extension cord, an oscillation in current is created which transfers power from the power supply 10 to the LEDs 52. The oscillating current alternatingly and continuously lights one LED section and then the other LED section. In this manner, all power coming through the LED panel assembly 50 is used to produce light. The LEDs 52 in the light panel assembly 50 can be operated from 1 kHz to 200 kHz. The voltage at the light panel incoming wires 55 can be up to 150 volts peak to peak at the LEDs 52 with no damage to the LEDs 52, even without current limiting resistors. This amount of voltage is far above normal voltage limits known for LEDs. The LEDs 52 will pull up to at least 5 amps. The LEDs 52 operating by the methods of this invention are performing by themselves, without any current limiting components. This feature allows a simpler, less expensive manufacture of the lights. A single LED in this system will produce 80 to 135 lumens per watt which is significantly greater than the 60-90 lumens per watt produced in a single LED by currently existing methods of powering LEDs. If one or more LEDs become inoperable the remaining operable LEDs will still function.

Figure 5:
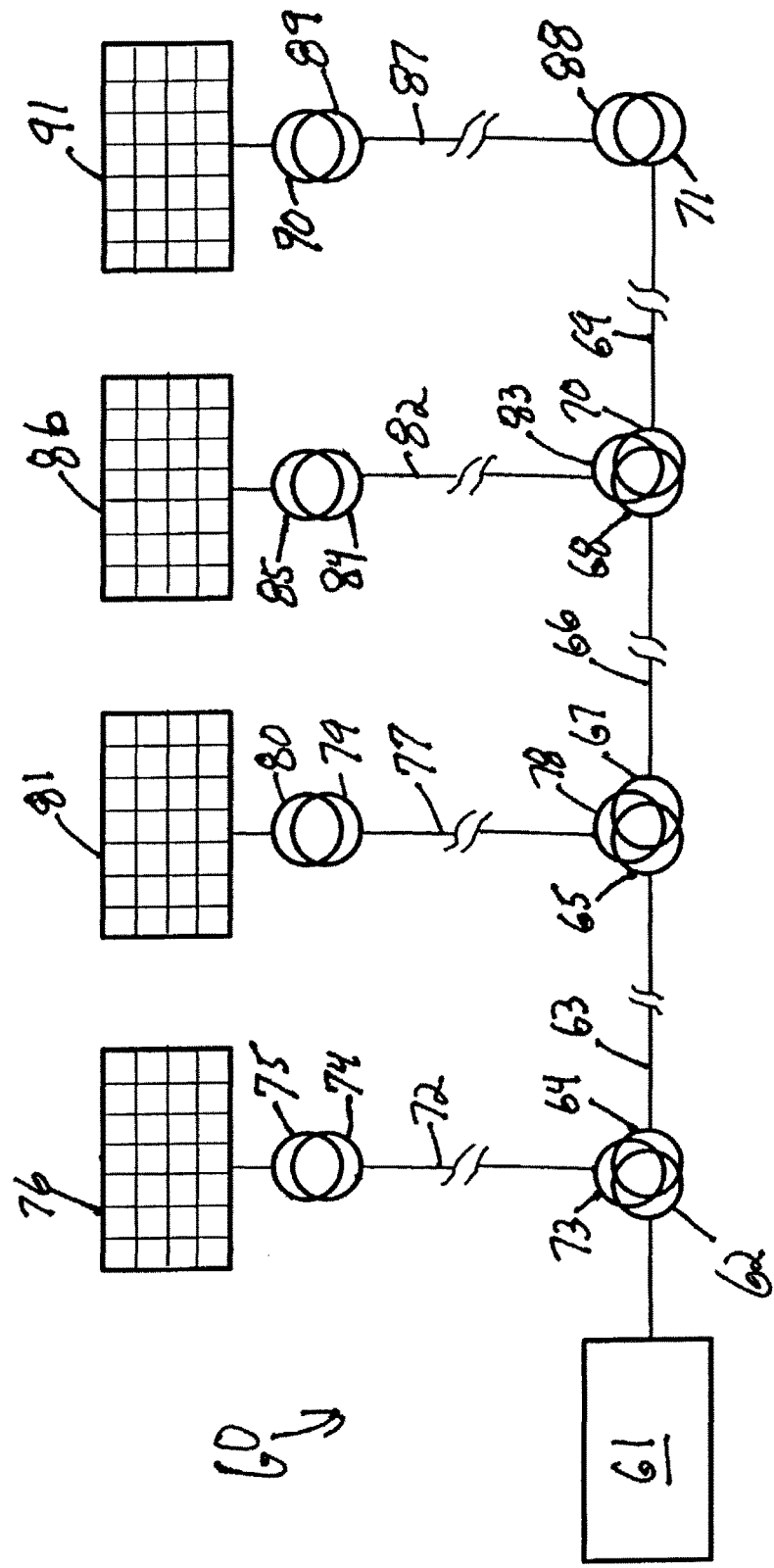
FIG. 5 is a diagram of the light emitting diode system of the present invention comprising a power supply, a power coil, a plurality of resonant inductive coupling extension cords, and a plurality of LED light panel assemblies.

FIG. 5 shows an LED light system 60 comprising a power supply 61, a power coil 62, a first extension cord 63 with a receiver coil 64 and a transfer coil 65, a second extension cord 66 with a receiver coil 67 and a transfer coil 68, and a third extension cord 69 with a receiver coil 70 and a transfer coil 71. The broken lines of the extension cords indicate indefinite length. Up to at least three extension cords can be connected in series. The system also has four other extension cords and four LED light panel assemblies. A fourth extension cord 72 has a receiver coil 73 connected to the power coil 62 and a transfer coil 74 connected to a receiver coil 75 of a first light panel assembly 76. A fifth extension cord 77 has a receiver coil 78 connected to the transfer coil 65 of the first extension cord 63 and a transfer coil 79 attached to a receiver coil 80 of a second light panel assembly 81. A sixth extension cord 82 has a receiver coil 83 attached to the transfer coil 68 of the second extension cord 66 and a transfer coil 84 attached to a receiver coil 85 of a third light panel assembly 86. A seventh extension cord 87 has a receiver coil 88 attached to the transfer coil 71 of the third extension 69 cord and a transfer coil 89 attached to a receiver coil 90 of a fourth light panel assembly 91. The resonant inductive coupling extension cords can be used to provide power over distances of hundreds of feet from a power supply.

With respect to the above description then, it is to be realized that the optimum dimensional relationships for the parts of the invention, to include variations in size, materials, shape, form, function and manner of operation, assembly and use, are deemed readily apparent and obvious to one of ordinary skill in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those of ordinary skill in the art, it is not desired to limit the invention to the exact construction and operation shown and described, and accordingly, all suitable modifications and equivalents may be resorted to, falling within the scope of the invention.

The invention claimed is:

1. A resonant inductive coupling extension cord system, comprising:
  a) a power supply having a power coil,
  b) said power supply generating a pulsed DC current at a frequency of 0.8 KHz or greater in said power coil, wherein said pulsed DC current is positive relative to ground;
  c) said power coil designed to transmit said pulsed DC current to a receiver coil by means of resonant inductive coupling;
  d) an extension cord or a plurality of extension cords, each extension cord having a receiver coil on one end to receive said pulsed DC current through resonant inductive coupling and a transfer coil on an opposite end to transmit said pulsed DC current through resonant inductive coupling; and
  e) said power supply providing said pulsed DC current, by means of resonant inductive coupling, through said power coil to any receiver coil on an electrically operated device, to any receiver coil on said extension cord or said plurality of extension cords, and to any transfer coil on said extension cord or on said plurality of extension cords.

2. The resonant inductive coupling extension cord system of claim 1, further comprising a receiver coil of each extension cord in said plurality of extension cords being connectable by resonant inductive coupling to a transfer coil of another extension cord in said plurality of extension cords, in series or in parallel or in series and in parallel.

3. The resonant inductive coupling extension cord system of claim 1, further comprising said power supply having two n-channel metal oxide semiconductor field-effect transistors (MOSFETs) in phase opposition to generate said pulsed DC current.

4. The resonant inductive coupling extension cord system of claim 3, wherein said MOSFETs are designed to deliver an output of two DC pulses, caused by alternatively grounding two sides of said power coil, said power coil receiving current through a center tap.

5. The resonant inductive coupling extension cord system of claim 1, further comprising a plurality of light emitting diodes connected to a receiver coil designed to receive said pulsed DC current from said power supply by means of resonant inductive coupling, said receiver coil of said plurality of light emitting diodes being connectable by resonant inductive coupling to said power coil or to a transfer coil.

6. The resonant inductive coupling extension cord system of claim 5, further comprising said plurality of said light emitting diodes being arranged in a first section and in a second section, wherein said first section has one or more light emitting diodes which are arranged in one direction and said second section has one or more light emitting diodes which are arranged in a second opposite direction.

7. The resonant inductive coupling extension cord system of claim 6, further comprising each said section having a plurality of rows of LEDs, with each row having a plurality of LEDs connected in series and having LEDs in a row being connected in parallel to adjacent LEDs in an adjacent row.

8. The resonant inductive coupling extension cord system of claim 5 wherein said light emitting diodes are powered by said power supply by resonant inductive coupling up to 160 volts.

9. The resonant inductive coupling extension cord system of claim 6 wherein said light emitting diodes are self-limiting with respect to current.

10. A resonant inductive coupling extension cord system, comprising:
  a) a power supply having a power coil,
  b) said power supply generating a pulsed DC current at a frequency of 0.8 KHz or greater in said power coil, wherein said pulsed DC current is positive relative to ground;
  c) said power coil designed to transmit said pulsed DC current to a receiver coil by means of resonant inductive coupling;
  d) an extension cord or a plurality of extension cords, each extension cord having a receiver coil on one end to receive said pulsed DC current through resonant inductive coupling and a transfer coil on an opposite end to transmit said pulsed DC current through resonant inductive coupling; and
  e) said power supply providing said pulsed DC current, by means of resonant inductive coupling, through said power coil to any receiver coil on an electrically operated device, to any receiver coil on said extension cord or said plurality of said extension cords, and to any transfer coil on said extension cord or on said plurality of extension cords;

f) a receiver coil of each extension cord in said plurality of extension cords being connectable to a transfer coil of another extension cord in said plurality of extension cords, in series or in parallel or in series and in parallel; and g) a plurality of light emitting diodes connected to a receiver coil to receive said pulsed DC current from said power supply, said receiver coil of said plurality of light emitting diodes being connectable to said power coil or to a transfer coil.

11. The resonant inductive coupling extension cord system of claim 10, further comprising said power supply having two n-channel metal oxide semiconductor field-effect transistors (MOSFETs) in phase opposition to generate said pulsed DC current.

12. The resonant inductive coupling extension cord system of claim 11, further comprising said MOSFETs being constructed to deliver an output of two DC pulses, caused by alternatively grounding two sides of said power coil, said power coil receiving current through a center tap.

13. The resonant inductive coupling extension cord system of claim 10, further comprising said plurality of said light emitting diodes being arranged in a first section and in a second section, wherein said first section has one or more light emitting diodes which are arranged in one direction and said second section has one or more light emitting diodes which are arranged in a second opposite direction.

14. The resonant inductive coupling extension cord system of claim 13, further comprising each said section having a plurality of rows of LEDs, with each row having a plurality of LEDs connected in series and having LEDs in a row being connected in parallel to adjacent LEDs in an adjacent row.

15. The resonant inductive coupling extension cord system of claim 10, wherein said light emitting diodes are powered by said power supply up to 160 volts.

16. The resonant inductive coupling extension cord system of claim 13, wherein said light emitting diodes are self-limiting with respect to current.

17. A resonant inductive coupling extension cord system, comprising:

a) a power supply having a power coil, b) said power supply generating a pulsed DC current at a frequency of 0.8 KHz or greater in said power coil, wherein said pulsed DC current is positive relative to ground;

c) said power coil designed to transmit said pulsed DC current to a receiver coil by means of resonant inductive coupling;

d) an extension cord or a plurality of extension cords, each extension cord having a receiver coil on one end to receive said pulsed DC current through resonant inductive coupling and a transfer coil on an opposite end to transmit said pulsed DC current through resonant inductive coupling; and e) said power supply providing said pulsed DC current, by means of resonant inductive coupling, through said power coil to any receiver coil on an electrically operated device, to any receiver coil on said extension cord or said plurality of said extension cords, and to any transfer coil on said extension cord or on said plurality of extension cords;

f) a receiver coil of each extension cord in said plurality of extension cords being connectable to a transfer coil of another extension cord in said plurality of extension cords, in series or in parallel or in series and in parallel;

g) a plurality of light emitting diodes connected to a receiver coil to receive said pulsed DC current from said power supply, said receiver coil of said plurality of light emitting diodes being connectable to said power coil or to a transfer coil; and h) said plurality of said light emitting diodes being arranged in a first section and in a second section, wherein said first section has one or more light emitting diodes which are arranged in one direction and said second section has one or more light emitting diodes which are arranged in a second opposite direction, wherein said light emitting diodes are powered by said power supply up to 160 volts, and wherein said light emitting diodes are self-limiting with respect to current.

18. The resonant inductive coupling extension cord system of claim 17, further comprising each said section having a plurality of rows of LEDs, with each row having a plurality of LEDs connected in series and having LEDs in a row being connected in parallel to adjacent LEDs in an adjacent row.

19. The resonant inductive coupling extension cord system of claim 17, further comprising said power supply having two n-channel metal oxide semiconductor field-effect transistors (MOSFETs) in phase opposition to generate said pulsed DC current.

20. The resonant inductive coupling extension cord system of claim 19, wherein said MOSFETs are designed to deliver an output of two DC pulses, caused by alternatively grounding two sides of said power coil, said power coil receiving current through a center tap.

21. A light emitting diode system, comprising a) a plurality of light emitting diodes connected to a receiver coil designed to receive a pulsed DC current from a power supply by means of resonant inductive coupling;

b) said power supply generating a pulsed DC current at a frequency of 0.8 KHz or greater, wherein said pulsed DC current is positive relative to ground; and c) said power supply providing said pulsed DC current, by means of resonant inductive coupling, through a power coil to said receiver coil.

22. The light emitting diode system of claim 21, further comprising said power supply having two n-channel metal oxide semiconductor field-effect transistors (MOSFETs) in phase opposition to generate said pulsed DC current.

23. The light emitting diode system of claim 22, wherein said MOSFETs are designed to deliver an output of two DC pulses, caused by alternatively grounding two sides of said power coil, said power coil receiving current through a center tap.

24. The light emitting diode system of claim 21, further comprising said plurality of said light emitting diodes being arranged in a first section and in a second section, wherein said first section has one or more light emitting diodes which are arranged in one direction and said second section has one or more light emitting diodes which are arranged in a second opposite direction.

25. The resonant inductive coupling extension cord system of claim 24, further comprising each said section having a plurality of rows of LEDs, with each row having a plurality of LEDs connected in series and having LEDs in a row being connected in parallel to adjacent LEDs in an adjacent row.

26. The light emitting diode system of claim 21 wherein said light emitting diodes are powered by said power supply by resonant inductive coupling up to 160 volts.

27. The light emitting diode system of claim 21 wherein said light emitting diodes are self-limiting with respect to current.

28. A light emitting diode system, comprising
   a) a plurality of light emitting diodes connected to a receiver coil designed to receive a pulsed DC current from a power supply by means of resonant inductive coupling;
   b) said power supply generating a pulsed DC current at a frequency of 0.8 KHz or greater, wherein said pulsed DC current is positive relative to ground;
   c) said power supply providing said pulsed DC current, by means of resonant inductive coupling, through a power coil to said receiver coil;
   d) said plurality of said light emitting diodes being arranged in a first section and in a second section, wherein said first section has one or more light emitting diodes which are arranged in one direction and said second section has one or more light emitting diodes which are arranged in a second opposite direction, wherein said light emitting diodes are powered by said power supply by resonant inductive coupling up to 160 volts and wherein said light emitting diodes are self-limiting with respect to current.

29. The resonant inductive coupling extension cord system of claim 28, further comprising each said section having a plurality of rows of LEDs, with each row having a plurality of LEDs connected in series and having LEDs in a row being connected in parallel to adjacent LEDs in an adjacent row.

30. The light emitting diode system of claim 28, further comprising said power supply having two n-channel metal oxide semiconductor field-effect transistors (MOSFETs) in phase opposition to generate said pulsed DC current.

31. The light emitting diode system of claim 30, wherein said MOSFETs are designed to deliver an output of two DC pulses, caused by alternatively grounding two sides of said power coil, said power coil receiving current through a center tap.

* * * * *